United States Patent [19]

Schausten

[11] Patent Number: 5,473,545
[45] Date of Patent: Dec. 5, 1995

[54] METHOD FOR STORING INDIVIDUAL PIECES

[76] Inventor: Christoph Schausten, Trierer Str. 40, 66709 Weiskirchen/Saar, Germany

[21] Appl. No.: 225,382

[22] Filed: Apr. 8, 1994

[30] Foreign Application Priority Data

Apr. 10, 1993 [DE] Germany .......................... 43 11 866.6
Jun. 2, 1993 [DE] Germany .......................... 43 18 341.7

[51] Int. Cl.$^6$ ..................................................... B65G 1/00
[52] U.S. Cl. ............................................ 364/478; 414/273
[58] Field of Search ................................... 364/478, 479; 414/900, 266, 273, 274, 799, 783; 901/1, 7

[56] References Cited

U.S. PATENT DOCUMENTS

| | | | |
|---|---|---|---|
| 4,692,876 | 9/1987 | Tenma et al. | 364/478 |
| 5,015,145 | 5/1991 | Angell et al. | 901/1 |
| 5,050,090 | 9/1991 | Golub et al. | 364/478 |
| 5,175,690 | 12/1992 | Berthier et al. | 364/478 |
| 5,175,692 | 12/1992 | Mazouz et al. | 364/478 |
| 5,273,392 | 12/1993 | Bernard, II et al. | 364/478 |
| 5,324,156 | 6/1994 | Spath | 414/273 |

FOREIGN PATENT DOCUMENTS 0525851 2/1993 European Pat. Off. .
4026449 3/1992 Germany .

OTHER PUBLICATIONS

Brochure Horst D. Roth Elektronik, Systems 85, Oct. 31, 1985.
BBC Nachrichten 1980, pp. 168–172.

Primary Examiner—Roy N. Envall, Jr.
Assistant Examiner—Steven R. Garland
Attorney, Agent, or Firm—Robert W. Becker & Associates

[57] ABSTRACT

In a method for storing individual pieces the identity and size of each individual piece is determined and a corresponding reference signal is produced that is sent to a computer. As parameters of the size the edge lengths of the pieces are used. Based on the parameters a storage location in the storage in the storage facility is selected so as to optimize the use of the available storage space. The individual piece is directly positioned into storage at the selected storage location, which is recognized and saved in the computer. Upon request, the individual piece can be removed with computer assistance from the storage facility.

14 Claims, 3 Drawing Sheets

Fig.1A
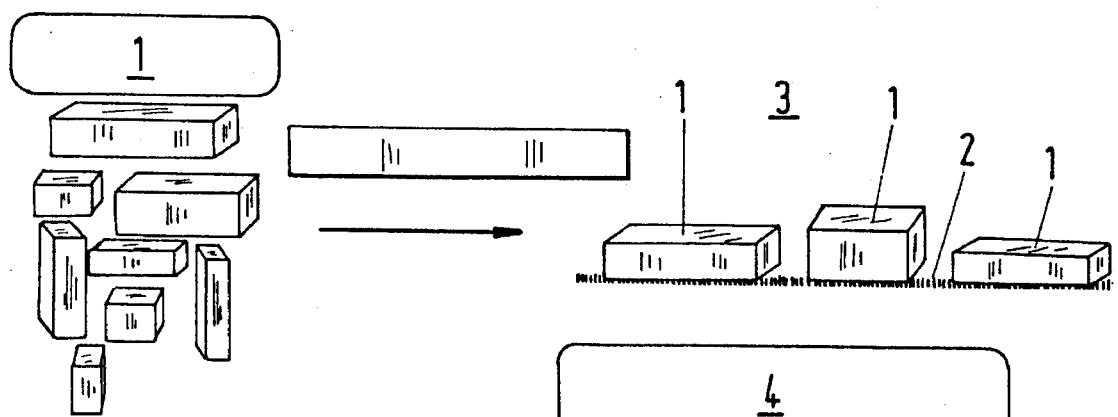
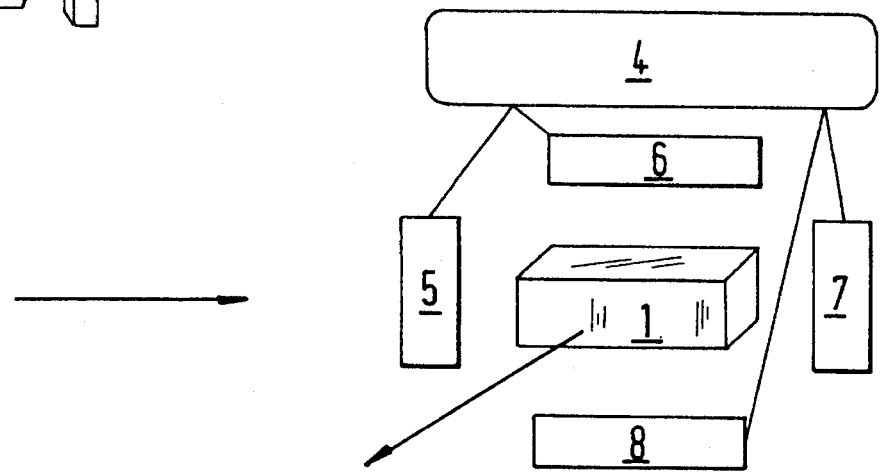
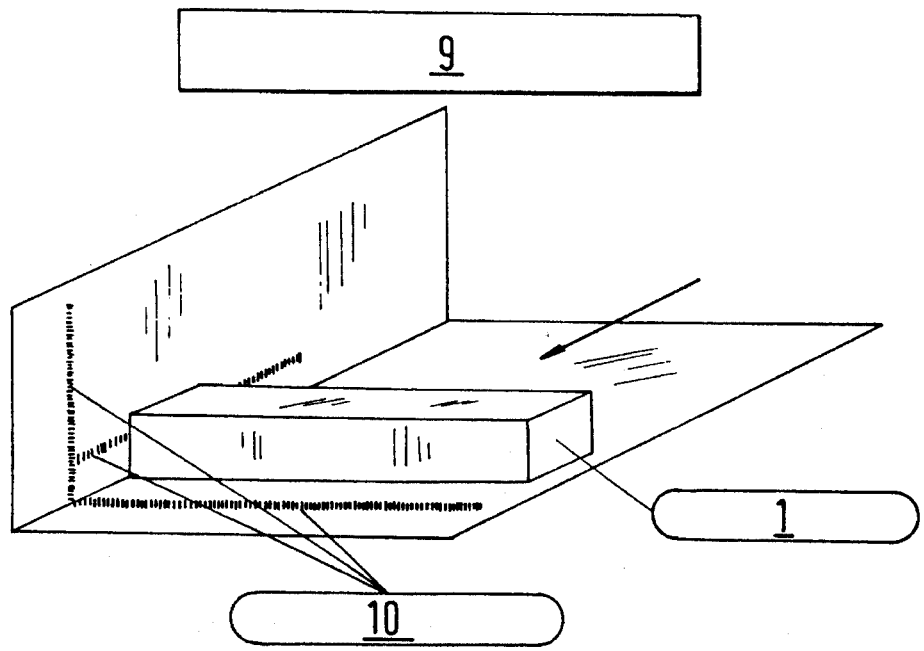

Fig 2A
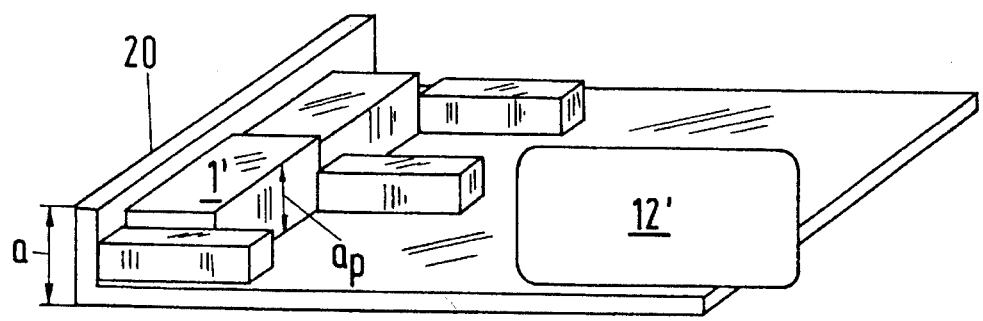
Fig 2B
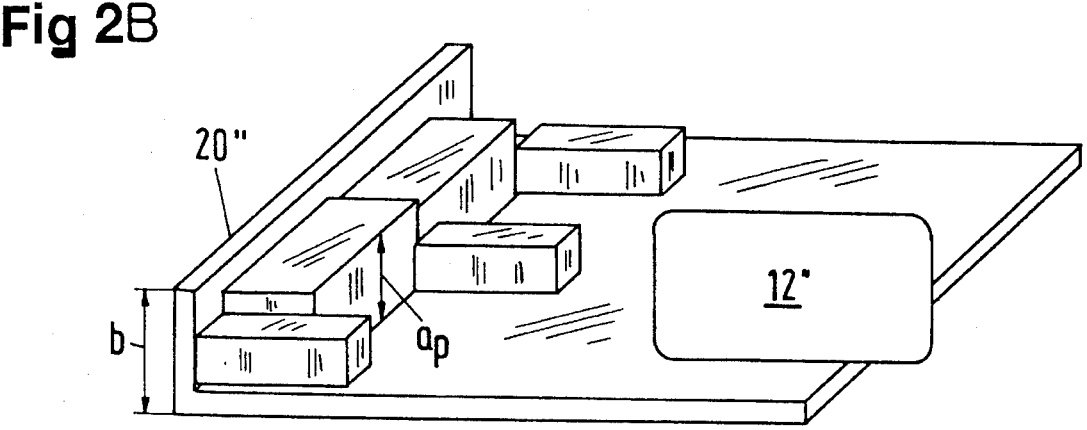
Fig 2C
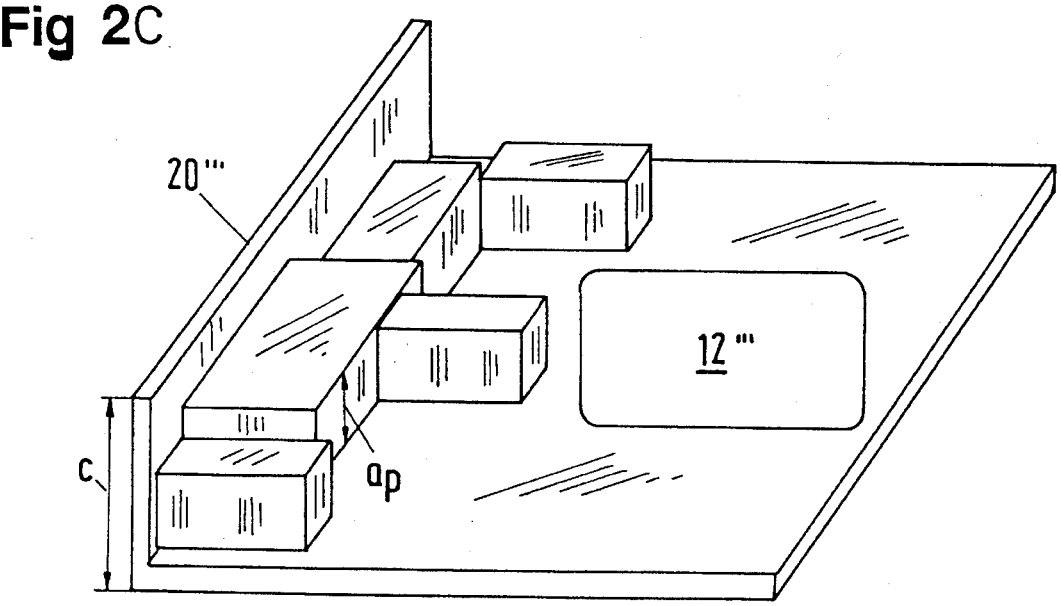

METHOD FOR STORING INDIVIDUAL PIECES

BACKGROUND OF THE INVENTION

The present invention relates to a method for storing individual pieces at a selected location in a storage facility, in which method the individual piece is identified and measured and subsequently the measured size is input as a signal to a computer which based on this signal selects a corresponding storage location.

Especially in pharmacies it is conventional to store different packages in drawers. As a filing or storing parameter conventionally the product name is being used. This has the disadvantage that the surface area within the drawers that is available cannot be optimally used for storing the pharmaceutical articles. Accordingly, in a pharmacy considerable amount of space is required for storing pharmaceutical products.

In a method of the aforementioned kind known from German Patent 40 26 449 individual pieces are stored on a pallet on which the individual pieces are then transported to the end storage facility. The cited document does not explain how the individual pieces stored on the pallet are then introduced into the storage facility and removed from it. For the known method an intermediate storage facility is important in which the measured and identified individual pieces are positioned in any suitable sequence. In order for the pallet to be loaded in an optimal manner, it is however required that the shape and the dimensions of a greater number of individual pieces, approximately 30%, is known. Only with the knowledge of a certain number of individual pieces the pallet can be loaded such that it is optimally filled. The use of the intermediate storage facility, however, makes the known device more expensive and increases the amount of time required for placing the individual pieces into storage.

The individual pieces are assembled on the pallet such that the individual pieces present within the intermediate storage facility that have the greatest base area or the individual pieces of a same height which together require the greatest base area are positioned on one corner of the pallet. The individual pieces having a different height from the first placed pieces but among them an identical height are then arranged on the opposite corner of the pallet. During the further filling of the pallet the individual pieces are stacked such that always the greatest possible continuous planar horizontal surfaces result. In this known method it is suggested that individual pieces of the same shape or substantially same shape are positioned together in order to comply with the requirement of a continuous planar horizontal surface area.

It is an object of the present invention to improve the method of the aforementioned kind such that the individual pieces can be stored within the shortest possible amount of time, that the available storage space is optimally used, and that a simple removal of the individual piece from the storage facility is possible.

BRIEF DESCRIPTION OF THE DRAWINGS

This object, and other objects and advantages of the present invention, will appear more clearly from the following specification in conjunction with the accompanying drawings, in which:

FIGS. 1A, 1B show in a schematic representation the method for storing individual pieces in a storage facility;

FIGS. 2A to 2C show in a schematic representation the arrangement principle for the individual pieces in the storage facility.

SUMMARY OF THE INVENTION

Figure 1B:
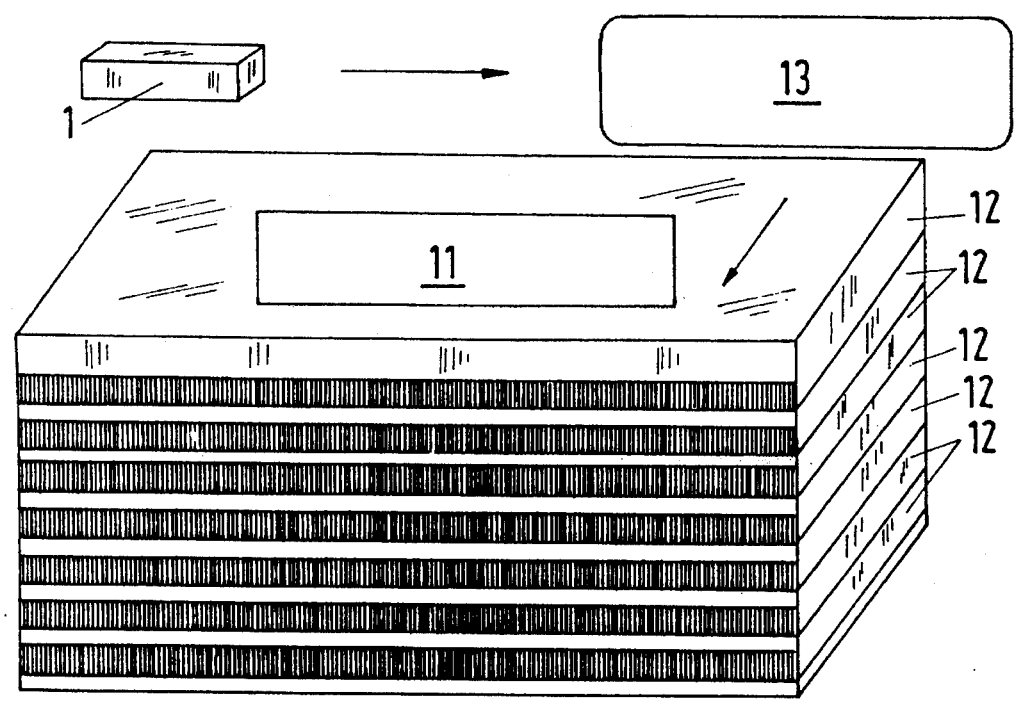

The inventive method for storing goods in the form of individual pieces according to the present invention is primarily characterized by the following steps:

Determining the identity and measuring the size of each individual piece to produce a reference signal containing information regarding the identity and the size of the individual piece;

Employing as parameters of the size the edge lengths of the individual piece;

Sending the reference signal to a computer;

Selecting based on the parameters of the individual piece a storage location in a storage facility in the form of a shelf system for which storage location an optimal use of the surface area of the storage facility is realized;

Directly positioning the individual piece into the storage facility at the selected storage locations;

Recognizing and saving within the computer the selected storage location of the individual piece; and Upon request, removing the individual piece with computer assistance from the selected storage location.

Advantageously, the shelf system has drawers.

Expediently, the method further comprises the step of controlling with the computer a handling device for placing the individual piece into the selected storage location.

In a preferred embodiment of the present invention the method further comprises the step of choosing as the parameter for selecting the storage location the shortest edge length.

In another embodiment of the present invention, the method further comprises the step of feeding without sorting a plurality of individual pieces to the storage facility.

Advantageously, the step of determining the identity of the individual piece includes the step of reading an identification code selected from the group consisting of a bar code and an OCR code.

Preferably, the step of reading the identification code is performed during transporting of the individual piece or, in the alternative, at the end of the transporting to the storage facility.

Advantageously, the step of measuring the size is performed mechanically and/or optoelectronically. Alternatively, the step of measuring the size is performed electrically and/or electronically.

It is also possible to perform the step of measuring the size by ultrasound.

In the inventive method the measured and identified individual pieces are directly stored within a shelf or drawer system without using an intermediate storage facility. As parameters for selecting the suitable storage location the edge lengths of the individual pieces are used. Based on the measurement of the individual piece and by taking into consideration the available storage space within the storage facility, it is calculated which position the individual piece should assume at a selected storage location in order to make possible an optimal use of the available surface area. In the inventive method, the knowledge of a greater number of individual pieces with respect to shape and dimensions before the actual storing step is not required. The individual pieces instead are measured and identified in the sequence in which they are fed to the storage facility and are then sequentially positioned at the respectively selected storage location. With this chaotic method of storing, individual pieces of different sizes can be arranged within the shelf or drawer system of the storage facility in a random manner instead of positioning individual pieces of the same size at the same general location. It is thus possible without problems to store within the storage facility adjacent to an individual piece of a considerable size another individual piece that with respect to its dimensions is substantially different and smaller. The respective storage location of the individual pieces are saved within the computer so that it is possible without problems to remove the desired individual piece from the storage facility with the aid of the computer. It has been demonstrated that when using the inventive method storage space of at least 50% can be saved. With the inventive method a space optimization is achieved but also a complete fulfillment of the logistic object to store supplied individual pieces in the available storage facility and to remove the individual pieces therefrom in an optimal manner.

Placing of the individual pieces can be performed manually or advantageously with a handling device. When the individual pieces are manually placed, the computer, for example, can print with a printer connected thereto a storage location list with which the personnel is able to place the individual pieces, for example, in connection with an optical coordination system, at the selected storage location. The selected storage location is advantageously marked from the exterior, for example, with a computer-controlled optical indicator. When a handling device is used, this handling device advantageously receives a signal from the computer, picks up the measured individual piece, and positions the individual piece in the correct position at the selected storage location.

Accordingly, with the inventive method the individual pieces are no longer alphabetically stored according to their product name within the storage facility, but exclusively with respect to their size so that the available storage space is optimally used.

DESCRIPTION OF PREFERRED EMBODIMENTS

The present invention will now be described in detail with the aid of several specific embodiments utilizing FIGS. 1A to 3.

With the method described in the following it is possible to place individual pieces into a storage facility such that the available storage space is optimally used. In the embodiment described this method is discussed in detail with respect to the turnover of individual pieces in a pharmacy. Of course, this method can be used in any situation where individual pieces must be stored in and removed from a storage facility.

With the aid of FIGS. 1A and 1B the method will be explained in more detail. When the individual pieces are supplied in packing units such as boxes etc, the individual pieces are removed from the boxes and placed onto a transporting device 2 of a separating unit 3. A presorting of the individual pieces or packages, for example, with respect to their size, is not required. In the separating unit 3 the individual pieces, for example, packages, are separated in a known manner. For example, this separation can be performed by vibration. The individual pieces 1 are then transported to a recognition device 4 which has reading devices 5 to 8, for example, scanners. With these reading devices 5 to 8 the identification code, for example, bar code, provided on the individual pieces 1 can be read. When the individual pieces are in the form of parallelepipedal packages 1, the bar code is commonly positioned on the narrow sides, at the bottom or the lid. Accordingly, the reading devices 5 to 8 are arranged such that they can read those four sides of the individual piece 1. The reading devices 5 to 8, respectively, the recognition device 4, are connected to a non-represented computer in which a data bank is installed in which products and preparations with their corresponding pharmaceutical ID number (bar code) are saved.

The recognition device 4 is advantageously arranged near the end of the transporting device of the separating unit 3. The transporting device 2 in this area is interrupted by a transparent surface, for example, a glass pane, in the downward and the outward direction so that the reading devices 5 to 8 are able to recognize the sides of the packages 1. As soon as the individual piece 1 reaches this transparent area of the transporting device 2, the reading devices 5 to 8 recognize the respective sides of the individual piece 1 and read the bar code present thereat. With this bar code or by optical character recognition (OCR) the respective package 1 is identified. This identification can take place during transport on the transporting device or at the end of the transporting path.

When the package 1 has an unfavorable position relative to the reading devices 5 to 8, such that the bar code cannot be recognized, the computer is provided with a corresponding signal. Then the computer activates a non-represented sorting device with which the non-identified package 1 is removed from the transport device 2 and returned to the beginning of the transport device.

After the reading devices 5 to 8 have identified the individual piece 1, the individual piece 1 upon further transport reaches a measuring device 9 with which the individual piece can be measured with respect to its outer dimensions. The measuring can take place electrically, electronically, optoelectronically mechanically, with ultrasound etc. In the shown embodiment the measuring device 9 has an optical measuring unit 10 that may be a light barrier, sensor, ultrasound device etc. or that can operate mechanically. In the shown embodiment, the measuring device 9 is provided with three CCD line cameras with which the individual piece 1 can be recognized with its three coordinates. These three cameras 10 in FIG. 1A are symbolically represented by the three spatial coordinates. The three cameras 10 are connected to the computer and transmit the corresponding measured values of the packaging 1 to the computer. Based on the three dimensions of the individual piece 1 the computer can compute the volume of the individual piece 1, respectively, the storage surface area of the individual piece. It is thus possible to compute the most suitable surface area with respect to optimizing the use of storage facility onto which surface area the individual piece 1 can be positioned in its storage position.

In the computer the available storage space (for example, surface area of the drawer useable height) locations of the storage facility 11 (FIG. 1B) is saved. This storage facility 11 is, for example, a drawer storage facility as is commonly used in pharmacies. In the individual drawers 12 the corresponding individual pieces are stored. Based on the measured values or parameters provided from the measuring device 9 to the computer, the computer checks at which storage location the measured individual piece can be stored with optimal use of the available space. The individual piece 1 is then transported to this storage location in a manner which will be described in detail infra. The computer then receives a corresponding signal indicating that this storage location has been taken. Furthermore, due to the recognition device 4 the computer is also aware which product has been placed at this storage location. When at a later time the pharmacist requests this product, it can be removed from the storage facility 11 with a corresponding handling device. The computer then again receives a signal indicating that this storage location is free. Furthermore, the computer is then informed that a certain preparation or product has been removed. In this manner, it is also possible to provide at all times a continuous inventory of the preparations or products. The corresponding program of the computer is advantageously embodied such that, for example, for a predetermined minimum inventory of a respective preparation or product an order form is automatically printed which must then only be signed by the pharmacist. In this manner it is ensured that all preparations and products are always available at the pharmacy.

Figure 3:
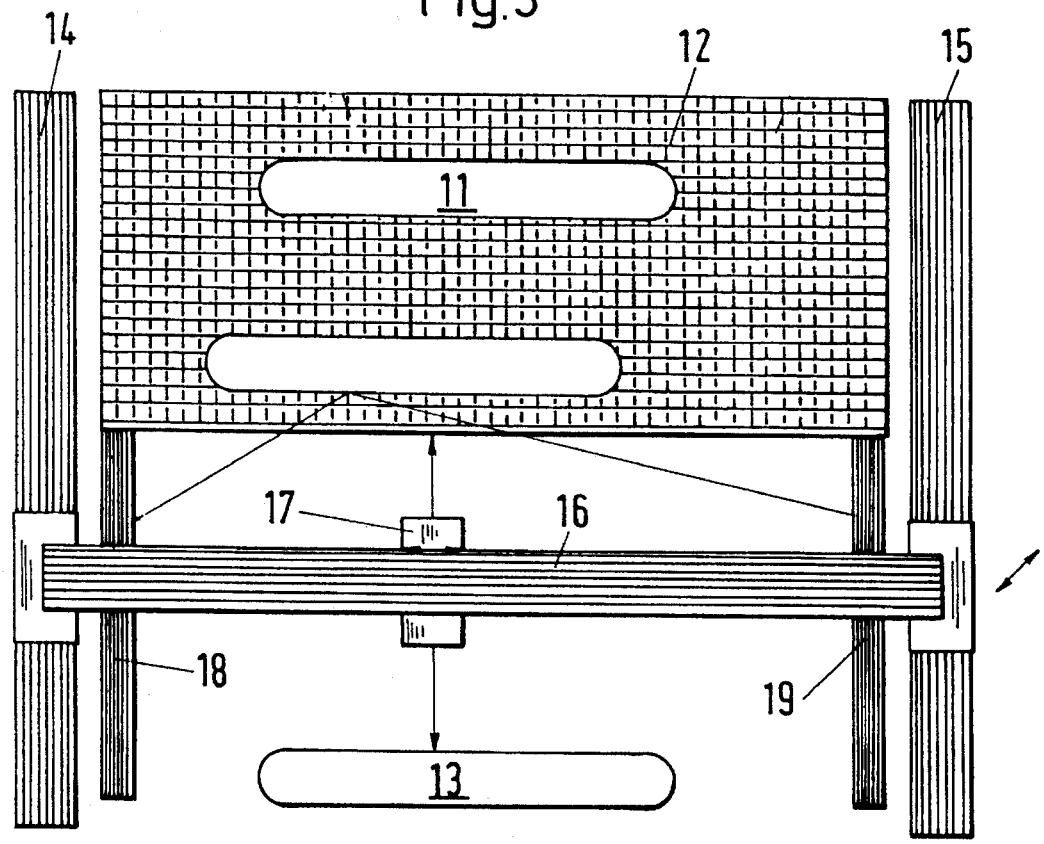
FIG. 3 in section and in schematic representation a handling device arranged in front of the storage facility.

The storage facility 11 may be in the form of an oversized drawer cabinet having drawers 12 which are controlled and activated by the computer. This allows for a completely automated loading and unloading of the drawers. For loading and unloading of the storage facility 11 a handling device 13 is provided which is preferably an robot with n axes. FIG. 3 shows a preferred embodiment of a handling device in the form of a portal robot. The portal robot 13 has two guide rails 14 and 15 arranged in the vicinity of the storage facility 11 on which a transverse beam 16 is slidable. The transverse beam 16 extends between the two guide rails 14 and 15 and is positioned in the area above the storage facility 11. The transverse beam 16 can be displaced in the sliding direction of the drawers 12 on the guide rails 14, 15.

In the longitudinal direction of the transverse beam 16 a vertical beam 17 is displaceable which extends perpendicular to the transverse beam 16. Along the vertical beam 17 a gripping device, not represented, is displacable in the direction of the height of the shelves. With the gripping device the individual piece can be removed from the respective drawer 12, respectively, can be placed into the drawer 12. The portal robot 13 is connected to the computer and is controlled such that the gripping device is guided to the respective storage location.

The drawer 12 of the storage facility 11 is displacable along guide rails 18 and 19. Via the computer the drawer 12 to be opened or closed is controlled and is preferably only opened to such an extent that the respective storage location is within the access area of the gripping device of the portal robot 13. When this storage location is in the vicinity of the front panel of the drawer 12 then the drawer 12 must be opened only to a small extent relative to the storage facility 11 so that a considerable amount of time is saved.

The transport device 2, on which the individual pieces 1 are sequentially advanced through the separating unit 3, the recognition device 4, and the measuring device 9, extends so far into the area of the robot 13 that the individual pieces can be gripped by the gripping device of the portal robot 13.

Instead of the described drawers, the storage facility 11 may also be provided with other suitable support structures.

Due to the measuring of the individual piece 1 in the measuring device 9 the spatial position and the three-dimensional size of the individual piece 1 relative to the transport direction is known. The data bank of the computer thus performs a correlation between the size of the package within its three known dimensions and the product based on its corresponding bar code (pharmaceutical ID number) as well as position of the bar code on the packaging. The computer generates corresponding signals based on which the gripping device of the portal robot 13 is provided with corresponding control signals. Accordingly, when the gripping device of the portal robot 13 is advanced to the individual piece 1, the gripping device is already positioned correctly for gripping the individual piece 1 so that it is possible without problems to grip the individual piece 1.

Depending on the two measuring results the geometric position of the individual piece 1 is calculated, the required storage surface area as well as the preferred storage side of the package is determined, the gripping side and the gripping position for the gripping device is determined, and the corresponding drawer 12 as well as the coordinates for the selected storage location within the drawer are calculated.

At the end of the transport device 2 the respective individual piece 1 is thus gripped by the portal robot 13 and is placed at the selected storage location, determined by the computer, in the selected drawer 12 in the correct position. While the gripping device takes up the individual piece 1 and transports it in the direction towards the storage facility 11, the corresponding drawer 12 is already being opened to the required length by the computer so that the gripping device can immediately place the individual piece into the drawer.

The handling device 13 may be provided with a suction device instead of the gripping device with which the individual piece can be held by suction.

In FIGS. 2A to 2C the storage of individual pieces 1 of different sizes will be explained in detail. In FIG. 2A a drawer 12' is represented having a front panel 20 of a small height a. Accordingly, the individual pieces 1 to be stored in this drawer can only have a dimension $a_p$ that is smaller than the height a of the front panel 20 of the drawer 12'. The computer which knows the dimensions of the drawer 12' thus determines the position of the individual piece 1 such that it can be stored within the drawer 12'. It can be seen from the drawings that the individual piece 1' is positioned in the drawer 12' such that it is resting on its wide side on the surface of the drawer. The individual piece 1' cannot be stored on edge within the drawer 12'. Correspondingly, the other individual pieces schematically represented in FIG. 2A are all positioned such that their dimensions measured in the vertical directions are smaller than the dimension a of the front panel 20.

FIG. 2B shows a drawer 12" having a front panel 20" with a height b that is greater than the height a of the front panel 20 of FIG. 2a. Correspondingly, greater individual pieces 1 can be stored in this drawer 12". However, these pieces must also be positioned in the drawer 12" such that their dimensions $a_p$ measured in the vertical direction are smaller than the height b of the front panel 20". The gripping device of the portal robot 3 is again controlled by the computer such that the individual piece is positioned within the drawer 12" such that it does not project past the upper edge of the front panel 20".

The drawer 12'" according to FIG. 2C has a greater height c. Thus even greater individual pieces can be stored therein. However, the individual pieces must be positioned such that their dimension $a_p$ in the vertical direction is smaller than the height c of the front panel 20'".

As can be seen in FIGS. 2A to 2C, the individual pieces are not alphabetically arranged or arranged according to product groupings as is conventionally the case. The storage arrangement is exclusively based on the size of the packaging, respectively, the storage surface area of the individual piece 1. The computer is able to determine the storage surface area, respectively, the storage volume based on the dimensions of the respective drawer and the pieces to be stored relative to the individual drawers such that an optimal use of the surface area with respect to the individual pieces is ensured. Since the computer knows the kind of product, its name, its size and also its selected storage location within the respective drawer, it is ensured that the pharmacist at any time can remove the required preparation or product from the storage device in a manner which will be described infra. With the gripping device of the portal robot 13 the individual pieces can also be placed adjacent to already stored packages for an optimal use of the available surface area in the corresponding drawer.

With the described method and the described device it is possible for a given base surface area to achieve a maximum storage volume by overlapping a large number of surface areas. For this purpose, it is necessary to minimize the distance between the selected storage locations. For this purpose, the smallest edge length of the individual piece is used as the height parameter so that accordingly the greater edge lengths form the storage surface area of the individual piece. In this manner, the storage locations of drawers of a low height can be optimally used. When the storage surface areas of low height drawers are occupied, the individual piece which initially has been allocated for a low profile drawer, is placed into a drawer of a greater height by possibly using a storage location of a smaller surface area.

In the following, a surface requirement for a storage facility 11 will be explained in an exemplary manner. It is presupposed that a pharmacy has an average of 8,000 different products. These products can be categorized into categories 1 to 5 with respect to the number of pieces present within the pharmacy. Category 1 includes those products of which 30 units are available in the pharmacy. This corresponds to approximately 0.5% of the presupposed 8,000 products. This means that the pharmacy has 1,200 units of these products available. In category 2 an average of 15 units of a certain product are present. Category 2 is approximately 1% of the available 8,000 different products within the pharmacy so that the pharmacy also has 1,200 units of these products (80×15). Category 3 includes such products of which there are on the average 5 units present in the storage facility of the pharmacy. This category 3 approximately comprises 2% of the 8,000 different products so that 800 (160×5) units result. Category 4 which includes products that are on the average present twice in the storage facility of the pharmacy corresponds to approximately 5% of the different products. Accordingly, the category 4 includes 800 (400×2) units. 91.5% of the 8,000 different products fall into category 5, i.e., the pharmacy has only one unit of these products in storage. Thus, category 5 has 7,320 (7,320×1) units. When taking into consideration all categories 1 to 5 11,320 units result, i.e., a pharmacy must have this average number of units in storage.

When the two larger sides of a parallelepipedal package (individual piece) are to be used as the storage sides, an average surface area per product of 5 cm by 7 cm=35 $cm^2$ results. In addition to this, a 4 mm wide intermediate space to the adjacent package must be provided as gripping space so that a surface area of 46 $cm^2$ results. Furthermore, an average surface area loss for the optimization of the storage space of approximately 15% must be taken into consideration. This results in an average surface area of 53 $cm^2$. The 11,320 units thus require a total storage surface area of 53 $cm^2$×11,320=60 $m^2$. In a pharmacy of an average size it is thus required to provide a storage facility with a storage surface area of 60 $m^2$.

From this required surface area the required necessary height for the storage facility 11 can be calculated. For this purpose, the smallest edge length of a package 1 is used as a parameter. In the following calculation it is assumed that the 11,320 units are uniformly distributed over 32 drawers 12 with a basic surface area of 2 $m^2$. The drawers 12 shall be divided into 5 types A to E whereby the type A has a height of 45 mm, the type B a height of 60 mm, the type C a height of 75 mm, the type D a height of 90 mm, and the type E a height of 110 mm. This height distribution results from the useable height of the drawers plus an additional 30 mm for the construction of the drawer, the required distance to the next drawer as well as the space required for a vacuum bottom within the drawer (to be explained in the following). When this additional dimension of 30 mm is subtracted, then an actual height for the types A to E of 15 mm to 80 mm is provided. The package sizes for a pharmacy can for example be as follows:

55% have a smallest edge length of 15 mm;

20% have a smallest edge length of 15 to 30 mm;

15% have a smallest edge length of 30 to 45 mm;

8% have a smallest edge length of 45 to 60 mm;

2% have a smallest edge length of 60 to 80 mm.

When this distribution is applied to the total number of 11,320 units, the following distribution results:

| | |
|---|---|
| 55% | 6,226 |
| 20% | 2,264 |
| 15% | 1,700 |
| 8% | 906 |
| 2% | 227. |

Those products that have a smallest edge length of up to 15 mm can be stored in drawer type A. Correspondingly, products with a smallest edge length of 15 to 30 mm can be stored in drawer type B, 30 to 45 mm in drawer type C, 45 to 60 mm in drawer type D and 60 to 80 mm in drawer type E. From this, under consideration of the average surface area for the products of 53 $cm^2$, the required storage surface area in the different types of drawers can be determined:

Type A: 6,226 packages×53 $cm^2$=33 $m^2$ drawer surface area for 45 mm height=17 drawers Type B: 2,264 packages×53 $cm^2$=12 $m^2$ drawer surface area for 60 mm height=6 drawers Type C: 1,700 packages×53 $cm^2$=9 $m^2$ drawer surface area for 75 mm height=5 drawers Type D: 906 packages×53 $cm^2$=4.8 $m^2$ drawer surface area for 90 mm height=3 drawers Type E: 227 packages×53 $cm^2$=1.2 $m^2$ drawer surface area for 110 mm height=1 drawer.

The combined drawer surface area thus result in a total surface area of 60 $m^2$. The height and the surface area of the drawers thus results in a net construction volume of 3.44 $m^3$.

For transporting the requested products from the storage facility 11 to the sale location, a non-represented product transport device is provided which transports the selected product advantageously directly to the sales counter. This product transport device, is for example, a conveyor belt on which the selected piece 1 is positioned by the portal robot 13. The width of this conveyor belt is adapted to the shortest side length of the individual piece 1 with the greatest shortest side.

Due to the fully automated storage facility it is advantageously possible to reposition the stored individual pieces 1 in order to further optimize the storage locations. Such a relocation may be performed expediently during closing hours of the pharmacy, for example, during lunch break or at night so that the pharmacy operation is not interrupted.

Instead of the aforedescribed computer-assisted automatic measuring and identification, which is the preferred method, it is also possible to manually guide the individual pieces 1 through an optical reading and measuring device. These devices then will send corresponding signals to the computer. The operator subsequently places the individual piece onto a transporting device from which it is then removed in the aforedescribed manner by the handling device and placed into storage. It is also possible to store the individual pieces manually, as described above.

The individual pieces 1 can also be measured and/or identified by hand. The collected data are then input via the keyboard of the computer. The computer then computes the optimal storage location for the individual piece. The storage of the individual piece then takes place as described above.

It is also possible that the individual piece is not stored and removed with a handling device, but is stored and removed manually. In order for the operator to recognize the storage location selected by the computer, different devices are possible. For example, the computer may control an indicator device that operates with light indicators that illuminate the selected storage location.

The drawers or other support surfaces may be equipped with light indicators, for example, LEDs that are controlled by the computer. Each drawer may be provided at its front panel with a LED so that the operator can detect the selected drawer when the corresponding LED lights up. In order to indicate within the drawer the selected storage location, the bottom of the drawer may be provided with perpendicularly arranged rows of LEDs which have a suitable distance to one another. The selected storage location is indicated by lighting one of the LED's.

Instead of the described preferred separation of the pieces 1 with the separating unit 3 the pieces can also be placed on a support. When the storage facility is a drawer shelf, one of the drawers may be the support, preferably the lowest drawer. The drawer is preferably removed to the rear so that the pieces 1 can be poured into the drawer. Advantageously, the pieces are somewhat distributed within the drawer. The drawer is then moved forwardly. A gripping device of the handling device 13 is provided with optical recognition devices, preferably, a camera. This camera is preferably movably connected to the gripping device so that it can recognize the pieces within the drawer from multiple sides. With such a recognition device the pieces can be measured and/or identified, and it is also possible to read the recommended date of use. When the piece is positioned such that, for example, the bar code cannot be read, the gripping devices grips the piece and turns it until the bar code, the recommended date of use etc. can be recognized.

The present invention is, of course, in no way restricted to the specific disclosure of the specification and drawings, but also encompasses any modifications within the scope of the appended claims.

What is claimed is:

1. A method for storing goods in the form of individual pieces, said method comprising the step of:

determining the identity and measuring the size of each individual piece to produce a reference signal containing information regarding the identity and the size of said individual piece, the size defined by edge lengths of said individual piece;

sending said reference signal to a computer;

selecting based on at least one of the edge lengths of said individual piece an optimal storage location in a storage facility in the form of a drawer shelf system with drawers by optimizing the use of the storage surface area of the drawers of the drawer shelf system as a function of the at least one edge length;

providing each one of the drawers with a front panel of a selected height;

using the selected height of the front panels in addition to the at least one edge length for optimizing the use of the storage surface area of the drawers;

directly positioning said individual piece into said storage facility at the selected storage location without intermediate storage, wherein the individual pieces are placed adjacent to one another on the storage surface area without stacking the individual pieces on top one another such that the individual pieces are directly accessible for removal;

recognizing and saving within said computer said selected storage location of said individual piece; and, upon request, removing said individual piece with computer assistance from said selected storage location.

2. A method according to claim 1, further comprising the step of controlling with said computer a handling device for placing said individual piece into said selected storage location.

3. A method according to claim 1, further comprising the step of choosing the shortest edge length for selecting said optimal storage location.

4. A method according to claim 1, further comprising the step of feeding without sorting a plurality of individual pieces to said storage facility.

5. A method according to claim 1, wherein said step of determining the identity of said individual piece includes the step of reading an identification code selected from the group consisting of a bar code and an OCR code.

6. A method according to claim 5, wherein said step of reading said identification code is performed during transport of said individual piece to said storage facility.

7. A method according to claim 5, wherein said step of reading said identification code is performed at the end of said positioning of said individual piece to said storage facility.

8. A method according to claim 1, wherein said step of measuring the size is performed mechanically.

9. A method according to claim 1, wherein said step of measuring the size is performed optoelectronically.

10. A method according to claim 1, wherein said step of measuring the size is performed mechanically and optoelectronically.

11. A method according to claim 1, wherein said step of measuring the size is performed electrically.

12. A method according to claim 1, wherein said step of measuring the size is performed electronically.

13. A method according to claim 1, wherein said step of measuring the size is performed electrically and electronically.

14. A method according to claim 1, wherein said step of measuring the size is performed ultrasonically.

* * * * *